United States Patent
Zatepyakin

(10) Patent No.: US 10,332,312 B2
(45) Date of Patent: Jun. 25, 2019

(54) SHAPE PREDICTION MODEL COMPRESSION FOR FACE ALIGNMENT

(71) Applicant: Facebook, Inc., Menlo Park, CA (US)

(72) Inventor: Evgeny Zatepyakin, London (GB)

(73) Assignee: Facebook, Inc., Menlo Park, CA (US)

( * ) Notice: Subject to any disclaimer, the term of this patent is extended or adjusted under 35 U.S.C. 154(b) by 15 days.

(21) Appl. No.: 15/390,520

(22) Filed: Dec. 25, 2016

(65) Prior Publication Data

US 2018/0182165 A1    Jun. 28, 2018

(51) Int. Cl.
| | | |
|---|---|---|
| *G06T 17/20* | (2006.01) | |
| *G06K 9/00* | (2006.01) | |
| *G06K 9/32* | (2006.01) | |
| *G06T 7/73* | (2017.01) | |
| *G06N 20/00* | (2019.01) | |

(52) U.S. Cl.
CPC ........ *G06T 17/205* (2013.01); *G06K 9/00228* (2013.01); *G06N 20/00* (2019.01); *G06T 7/73* (2017.01); *G06T 2207/10004* (2013.01); *G06T 2207/30201* (2013.01)

(58) Field of Classification Search
None
See application file for complete search history.

(56) References Cited

U.S. PATENT DOCUMENTS

| 7,403,643 | B2 | 7/2008 | Ianculescu et al. | |
| 2003/0149793 | A1* | 8/2003 | Bannoura | H04L 29/06 709/247 |
| 2008/0063263 | A1 | 3/2008 | Zhang et al. | |
| 2008/0310759 | A1 | 12/2008 | Liu et al. | |
| 2016/0055368 | A1* | 2/2016 | Cao | G06K 9/00268 382/195 |
| 2017/0083751 | A1* | 3/2017 | Tuzel | G06T 7/0028 |

OTHER PUBLICATIONS

Cao, X. et al., "Face Alignment by Explicit Shape Regression," *IEEE*, 2012, pp. 2887-2894.
Kazemi, V. et al., "One Millisecond Face Alignment with an Ensemble of Regression Trees," in *2014 Conference on Computer Vision and Pattern Recognition*, Columbus, Ohio, USA, eight pages.
Lee, D. et al., "Face Alignment using Cascade Gaussian Process Regression Trees," in *2015 Conference on Computer Vision and Pattern Recognition*, pp. 4204-4212, Boston, Massachusetts, USA.

* cited by examiner

*Primary Examiner* — Tize Ma
(74) *Attorney, Agent, or Firm* — Fenwick & West LLP

(57) ABSTRACT

A face tracking system generates a model for extracting a set of facial anchor points on a face within a portion of a face image based a multiple-level cascade of decision trees. The face tracking system identifies a mesh shape adjusted to an image of a face. For each decision tree, the face tracking system identifies an adjustment vector for the mesh shape relative to the image of the face. For each cascade level, the face tracking system combines the identified adjustment for each decision tree to determine a combined adjustment vector for the cascade level. The face tracking system modifies adjustment of the mesh shape to the face in the image based on the combined adjustment vector. The face tracking system reduces the model to a dictionary and atom weights using a learned dictionary. The model may be more easily transmitted to devices and stored on devices.

22 Claims, 7 Drawing Sheets

SHAPE PREDICTION MODEL COMPRESSION FOR FACE ALIGNMENT

BACKGROUND

This disclosure relates generally to recognizing facial positioning and alignment in an image, and more specifically to localizing positions of facial anchor points on a face.

Face alignment localizes facial anchor points on a face in an image. Facial anchor points are contour points around facial features such as eyes, noses, mouth, and jaw lines. Features (e.g., shape and texture) extracted from the localized facial anchor points provide fundamental information for many face processing applications, such as face tracking, face modeling, face recognition, facial expression analysis, and face synthesis. A number of different approaches exist for face alignment. Examples of these approaches include a cascade of gradient boosted decision trees (GBDTs), a cascade of Gaussian process regression trees, or other cascade learning framework. However, many of these approaches currently suffer from drawbacks.

One drawback is that these approaches drive up cost and power consumption. For example, some approaches need to calculate a transformation matrix between current coordinates defined in an image and coordinates defined in a default shape for each facial anchor point. This calculation is computationally intensive. In another example, prediction models generated by these approaches may be too large to be stored on a mobile device or quickly downloaded, which can prevent any required updates.

Another drawback is that these approaches may not provide accurate prediction models. For example, these approaches train prediction models globally without considering large variations on facial pose, facial lighting, facial expression, and occlusion. In another example, over-fitting occurs when there is a discrepancy between learning rate and prediction. Without considering variations on different levels of a cascade, these approaches apply a global learning factor (also referred to as shrinkage factor) to all levels of the cascade to reduce over-fitting. This may result in inaccurate shape prediction.

SUMMARY

A model using a set of regression trees determines adjustment of a facial shape that describes facial anchor points of a face to match the face in an image. The model includes a set of ordered, sequential cascade levels that each includes a set of decision trees. At each layer of the cascaded decision tree, the trees within a layer evaluate a current fitted shape (e.g., the current estimation of the shape to represent the face in the image) with respect to the image to determine a shape adjustment for the layer. Within the decision tree, nodes that describe logic for traversing the tree determine the next node based on an evaluation (e.g., comparison or intensity difference) of the pixel values corresponding to positions on the facial shape. To account for the change in facial shape as it is fitted to different images, the positions that a node evaluates are defined with respect to elements of the facial shape. For example, the facial shape may comprise a mesh of geometric elements, such as triangles. The positions being compared by a node are defined with respect to an element in the mesh, and with respect to vertices or edges of the element. For example, the positions may be defined by barycentric coordinates. To determine the pixel location to sample a pixel value to perform the evaluation, the element specified by the position is identified in the current fitted shape, and the barycentric coordinates are applied to identify the pixel corresponding to the specified barycentric coordinates of the element. Thus, the pixel values for each position are determined for a node, and the pair of pixel values of a node are evaluated and compared to a threshold that designates a subsequent node.

When a leaf node is reached in a tree, each leaf node specifies an adjustment vector having a set of adjustment values for the facial anchor points. Within a cascade level, the adjustment values of the trees are combined (e.g., by averaging) to determine an adjustment of the facial anchor points for the current fitted shape. The current fitted shape for a level is thus adjusted by the adjustment values for the level, and, the adjusted shape is used as the current shape for the next level. Because the positions of the nodes are determined with reference to elements of a shape, the pixels to sample can be determined very quickly relative to other techniques, which may require a more complex determination of and application of a transform matrix.

The model may be trained to learn the threshold values for decisions at nodes and to output an effective adjustment vector at each leaf node. The model may be trained with sample images and possible shapes relative to the sample images. To increase training available training data, additional sample shapes may be generated using an inverse histogram of properties of the images. For example, images which are associated with properties with few instances in the histogram may form the basis for generating more example images or shapes than images associated with properties having many instances in the histogram.

The model may also modify characteristics of the cascade levels and the training of the cascade levels based on which cascade level is being trained. For example, the positions associated with a node may be randomly determined to initialize the decision trees. The random positions may be constrained by a maximum distance of positions from one another. At earlier cascade levels, the maximum distance of the possible positions for a node to evaluate may be larger than at lower positions (i.e., at earlier tree levels, positions may be farther apart, while at lower levels the positions are constrained to be closer together). In addition, a learning factor for the trees may also be adjusted during training, such that the higher (earlier) cascade levels are less sensitive to error and while lower (later) cascade levels are more sensitive to error, which can prevent higher levels from over-fitting and permitting lower levels to provide finer-grained changes to the fitted shape. A cost function may also be selected that reduces sensitivity to outliers for higher cascade levels.

The resulting model may be relatively large. To reduce the size of the model, the adjustment vector for a node may be converted to a representation of the adjustment vector as a set of "atoms" each specifying a function for adjustment values and an associated weight of the atom. Thus a leaf node may specify that adjustment values as atom 43 at weight 0.8, atom 87 at weight 0.4, and atom 5 at weight 0.15. To determine the adjustment values for the leaf node, the function for each atom is retrieved and applied according to the associated weight. In this way, the model may be represented as the logic for traversing the trees, the dictionary of atoms, and the set of atoms and weights for each leaf node. The identification of nodes and weights may be determined by a matching pursuit or orthogonal matching pursuit algorithm. By reducing the model to the dictionary and atom weights, the model may be more easily transmitted to devices and stored on devices with limited storage space or memory. In addition memory usage is reduced because only adjustment values are only determined for leaf nodes that were actually reached in the decision trees, and can be quickly computed by identifying the relevant atoms and weights.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1A:
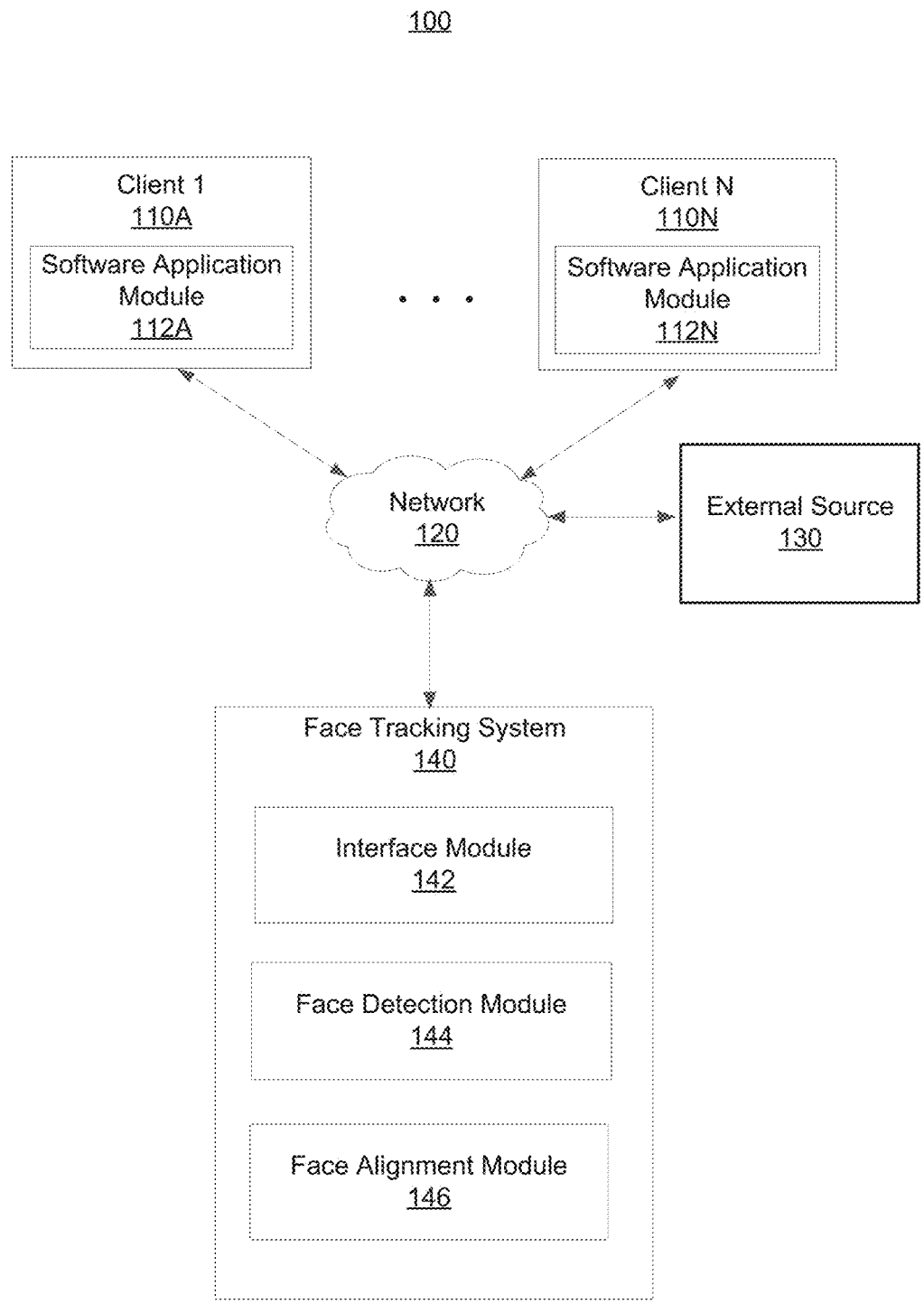
FIG. 1A is a system environment of a face tracking system including a face alignment module, in accordance with an embodiment.

FIG. 1A is a system environment 100 of a face tracking system 140 including a face alignment module 146, in accordance with an embodiment. The system environment 100 shown by FIG. 1 comprises one or more client devices 110, a network 120, one or more external sources 130, and the face tracking system 140. In alternative configurations, different and/or additional components may be included in the system environment 100.

The client devices 110 are one or more computing devices capable of capturing face images of a user, receiving user input as well as transmitting and/or receiving data via the network 120. In one embodiment, a client device 110 is a conventional computer system that includes an imaging device for capturing images having a user's face. Examples of an imaging device include a camera, a video camera, or other image capture device. Thus, one example client device 110 client device is a desktop computer having a camera or a laptop computer integrated with a webcam. Alternatively, a client device 110 may be a device having computer functionality internally or externally integrated with an imaging device. Examples of a device having computer functionality may include a personal digital assistant (PDA), a mobile telephone, a smartphone, or another suitable device. In one embodiment, a client device 110 executes an application 112 allowing a user of the client device 110 to interact with the face tracking system 140. For example, a client device 110 executes a browser application to enable interaction between the client device 110 and the face tracking system 140 via the network 120. In another embodiment, a client device 110 interacts with the face tracking system 140 through an application programming interface (API) running on a native operating system of the client device 110, such as IOS® or ANDROID™.

The application 112 on the client device may perform facial alignment of a face within the captured image. To determine the facial image, the application 112 applies a trained model to analyze a face in the image to extract a set of facial anchor points on the face. The application 112 may receive the trained model from the face tracking system 140 and after applying the model, use the extracted set of facial anchor points to interpret or augment the image. The application 112 may determine facial anchor points as described below with respect to modules of the face tracking system 140. After identifying the facial anchor points, the application 112 may use the anchor points to track and characterize the face, for example to look for further features of the face between anchor points, or to display an overlay or mask over the user's face. The anchor points may also be captured over time to identify how a user's face moves during a video capture, which may for example be used to populate animated expressions using the anchor points, among other uses. The application 112 may also send the set of facial anchor points to another client device or the face tracking system 140 for similar uses. An a further example, the application 112 may provide video chat services for users of the client device, permitting users to capture and send video to another user. By capturing the anchor points of a face during the video, the video can be augmented using the anchor points, e.g., to add a mask to a user's face, or the by sending the anchor points for each frame of the video to another client device. In some embodiments, the anchor points may be determined for an initial frame of the video, and subsequent frames may use alternate face tracking techniques to monitor the movement of the face after the anchor points have been determined.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more external sources 130 may be coupled to the network 120 for communicating with the face tracking system 140. In one embodiment, an external sources 130 provide various face databases to the face tracking system 140. A face database may include training data, test data, or both. Training data may include images with labeled facial anchor points for training prediction models. Test data may include images for testing prediction models. Examples of face database may include HELEN database, LFPW database, BioID database, LFW87 database, or other suitable face database.

The face tracking system 140 generates a model for extracting a set of facial anchor points on a face within a portion of a face image captured by the client device 110. The face tracking system 140 shown in FIG. 1 includes an interface module 142, a face detection module 144, and a face alignment module 146. In other embodiments, the face tracking system 140 may include additional, fewer, or different components for various applications. For example, the face tracking system 140 may include a face modeling module, a face recognition module, a facial expression analysis module, and a face synthesis module.

The interface module 142 facilitates the communication among the client device 110, the face tracking system 140, and the external source 130. In one embodiment, the interface module 142 interacts with the client devices 110 and may provide a prediction model for extracting anchor points to the client device 110, and may also receive the captured face image and provide extracted facial anchor points to the client device 110. The interface module 142 may receive one or more face databases from the external source 130. In another embodiment, the interface module 142 may provide the prediction model to the client device 110 for further processing.

The face detection module 144 identifies a face in the captured face image. For example, the captured face image may include a user's face, the user's body, and objects around the user. The face detection module 144 distinguishes the user's face from the user's body and objects around the user. The face detection module 144 may mark the user's face using a bounding box.

The face alignment module 146 localizes facial anchor points with the captured face image using a prediction model. Examples of facial anchor points may include contour points around facial features such as eyes, noses, mouth, and jaw lines. The prediction model predicts a fitted shape of the face based on a default shape and the captured face image. A default shape provides a set of predefined facial anchor points corresponding to a generic face. In some embodiments, a default shape may be a mean shape obtained from training data as further described below. The default shape may be centered and scaled according to a bounding box including an identified face. The bounding box may be cropped for further processing to reduce computational cost.

Figure 1B:
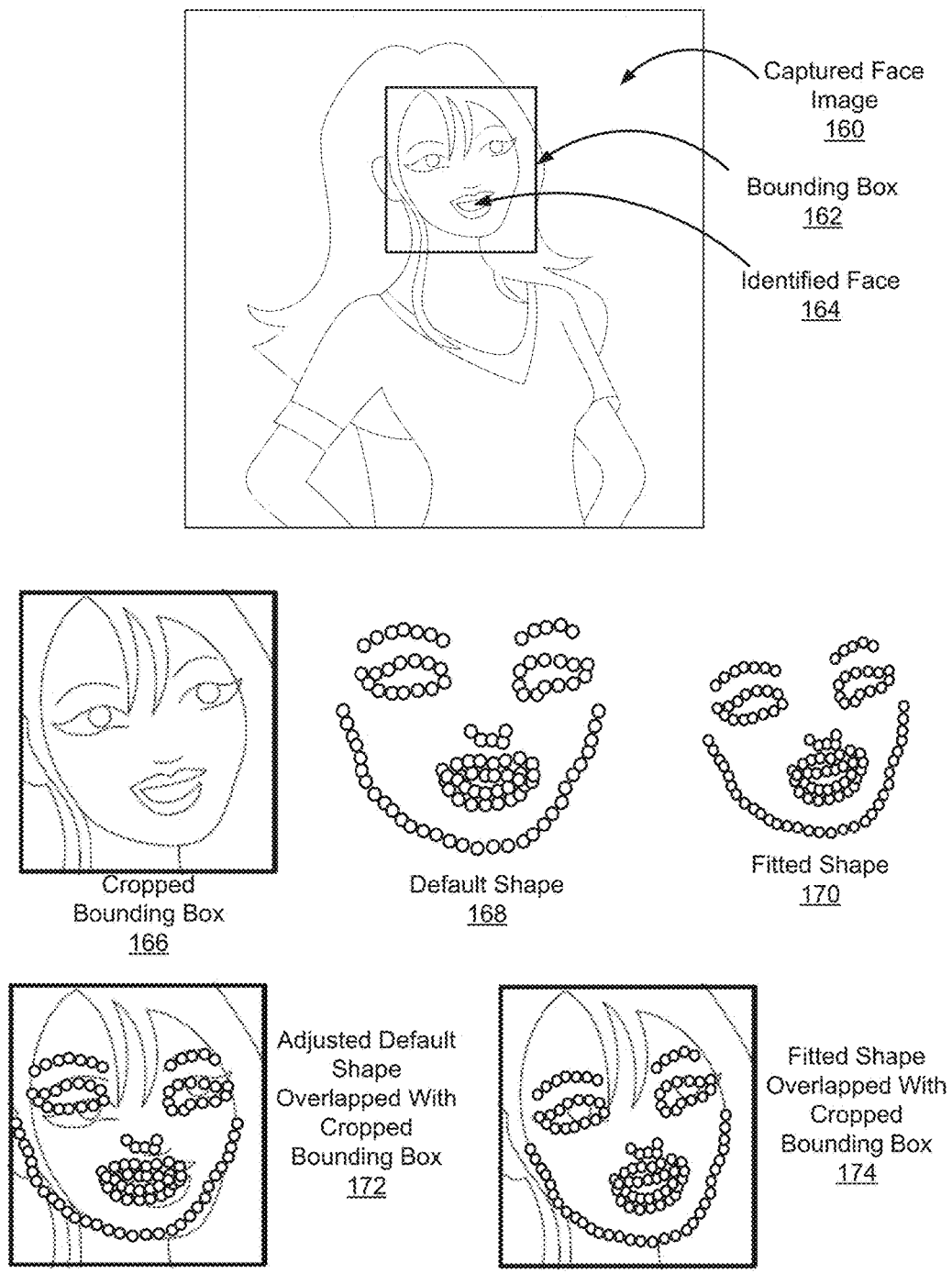
FIG. 1B shows examples of a captured image and identification of a facial shape for the image, in accordance with an embodiment.

FIG. 1B shows examples of a captured image 160 and identification of a facial shape for the image, in accordance with an embodiment. FIG. 1B includes a bounding box 162 having an identified face 164, a cropped bounding box 166, a default shape 168 and a fitted shape 170 of the system environment illustrated in FIG. 1A. As shown in FIG. 1B, the default shape 168 has predefined facial anchor points around eyes, noses, mouth, and jaw lines. The default shape 168 is centered and scaled according to the cropped bounding box 166. The default shape does not account for the actual position and alignment of the face in the image. By applying the prediction model as described below, the fitted shape 170 is identified that has better positions of the facial anchor points aligned with the identified face in the cropped bounding box 166 than the adjusted default shape 172.

Barycentric Mesh-Based Shape

In one embodiment, the face alignment module 146 uses a barycentric mesh-based shape for prediction. The barycentric mesh-based shape uses a barycentric coordinates system. The barycentric coordinate system is a coordinate system in which a position of a point within an element (e.g., a triangle, or tetrahedron) is represented by a linear combination of its vertices. For example, when the element is a triangle, points inside the triangle can be represented by a linear combination of three vertices of the triangle. The mesh-based shape may consist of multiple triangles covering all the predefined facial anchor points. Each facial anchor point can be represented by a linear combination of vertices in an associated triangle.

Figure 2:
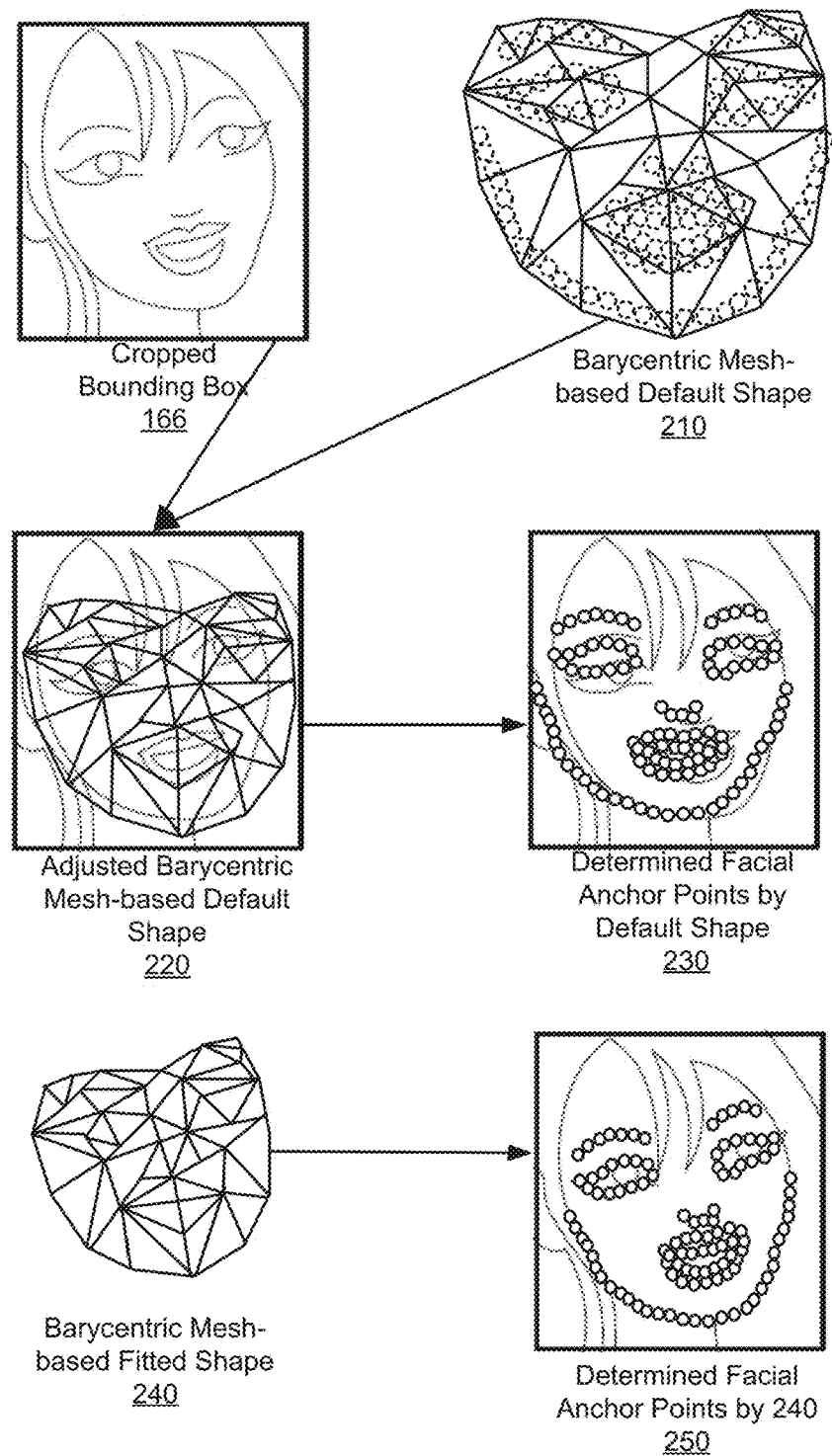
FIG. 2 shows an example of barycentric mesh-based shapes, in accordance with an embodiment.

FIG. 2 shows an example of barycentric mesh-based shapes, in accordance with an embodiment. As shown in FIG. 2, a barycentric mesh-based default shape 210 has multiple triangles. The triangles cover all the predefined facial anchor points as shown in dash lines. The barycentric mesh-based default shape 210 may be adjusted according to the cropped bounding box 166. The adjusted barycentric mesh-based default shape 220 may determine updated positions of predefined facial anchor points 230 using vertices of the associated triangles to correspond the predefined facial anchor points to the default shape applied to the cropped bounding box 166. When applying the prediction model, a barycentric mesh-based fitted shape 240 is generated to adjust the mesh to the face within the image and include updated triangles. Then, the barycentric mesh-based fitted shape 240 may determine updated positions of predefined facial anchor points 250 using vertices of associated update triangles.

Node Split Based on a Pixel Comparison in a Regression Tree

To extract and generate the set of anchor points 250, the prediction model uses regression trees. A regression tree has multiple nodes. The nodes can be divided into split nodes and leafs. Each leaf (e.g., a node without children) generates an adjustment vector to adjust a current shape. A split node represents a traversal decision of the tree. At each split node in the regression tree, a traversal decision is made based on a threshold difference between intensities of two pixels in a captured image. Two pixels are defined in a coordinate system of the default shape. To compare coordinates for traversing the tree, however, the coordinate system of the two pixels is translated to the location of the shape on the image. Thus, the coordinate system of the default shape is translated through the current position of the shape to determine a coordinate on the image. For example, a captured image is represented in a Cartesian coordinate system, and a barycentric mesh-based default shape is represented in a Barycentric coordinate system. Two positions in the barycentric mesh-based default shape close to predefined facial anchor points are selected. As mentioned above, the barycentric mesh-based default shape is adjusted according to a bounding box in the captured image. The shape may be further adjusted to one or more fitted shapes, as further discussed below, that closer align the shape with the facial image. The two positions of pixels in the coordinate system of the default shape are also translated according to the adjusted shape to determine the corresponding pixels on the image. A difference between intensities of the two determined pixels on the image can be calculated. For example, assume that there are two pixels A and B. A normalized difference between two pixels is calculated based on (pixel A−pixel B)/(pixel A+pixel B). In another example, a difference may be calculated based on (pixel A−pixel B). By comparing the calculated normalized difference or difference with an associated threshold, a decision is made designating a subsequent node in the tree.

Figure 3:
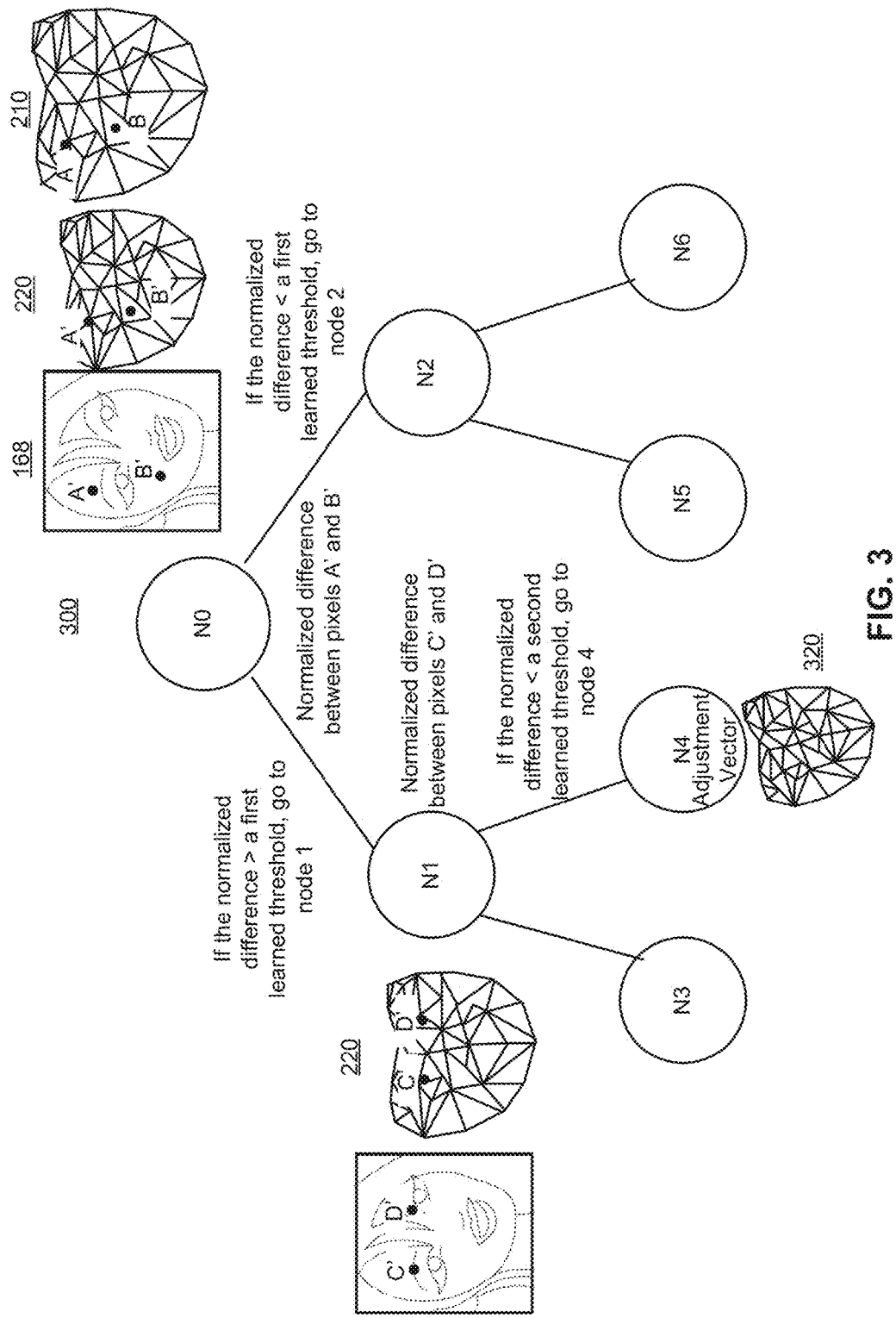
FIG. 3 shows an example of a regression tree for generating an adjustment vector, in accordance with an embodiment.

FIG. 3 shows an example of a regression tree 300 for generating an adjustment vector, in accordance with an embodiment. In the example of FIG. 3, the regression tree 300 includes two depths and 4 leafs (N3-N6). An input for the regression tree 300 includes a cropped bounding box 168 having an identified face and a barycentric mesh-based default shape 210. In other examples, the mesh shape input to the tree may include already-applied adjustments to the default mesh, for example from a prior adjustment of the shape to match the face. For node N0, two positions A and B close to predefined facial anchor points are specified in the default shape 210. The default shape 210 is adjusted according to the cropped bounding box 168. After adjusting the default shape to the cropped bounding box 168, the adjusted default shape 220 may have the same size as the cropped bounding box 168. Accordingly, the two positions A and B are adjusted to determine two pixels A' and B' in the adjusted default shape 220. Since the positions A, B may be defined with respect to a specific triangle or element in the default shape 210 and the adjusted default shape 220 is located on the image, the pixels A', B' in the image may be identified as the pixel location in the image corresponding to the element-defined coordinate of A', B' in the adjusted default shape 220. At node N0, a normalized difference between two pixels A' and B' in the image is calculated, and the normalized difference is compared with a first threshold associated with N0. The first threshold may be learned from training data. If the normalized difference is larger than the first learned threshold, the decision tree proceeds to node N1, and if the difference smaller than the first learned threshold, the decision tree proceeds to node N2. At a node N1, two pixels C' and D' close to predefined facial anchor points are similarly identified based on specified positions C and D for the node N1. That is, positions C and D may be specified by node N1 in respective barycentric coordinates with respect to an element of a mesh, and pixels C' and D' are determined by identifying the pixel in the image corresponding to the coordinates as applied to the location of element in the adjusted default shape 220.

After comparing the normalized difference of pixels C' and D', node N1 proceeds to node N3 or N4 based on the threshold. If the normalized difference is smaller than the first learned threshold, at a leaf N4, an adjustment vector is generated. The adjustment vector is applied to the adjusted default shape 220 to generate a fitted shape 320. The fitted shape 320 has the same size as the cropped bounding box 168.

Since the positions of a node are defined with respect to the elements of the adjusted default shape, the pixel coordinates are quickly identified using the vertices of the specified element in the adjusted default shape. The barycentrically-defined position can then be applied to the vertices to determine the pixel location within the image. This permits rapid traversal of the tree, as identification of desired pixels for the threshold comparison simply looks up the location of the desired pixel by the coordinates of the adjusted default shape, which is 'overlaid' on the image and mapped to the image coordinates. As such, this technique does not require a transformation matrix (e.g., describing scale and rotation modifications) or other complex formula to map pixel comparison locations for a node to the image. This reduces errors and computational cost caused by calculations of transformation matrix.

A Prediction Model Based on a Cascade of Regression Trees

Figure 4:
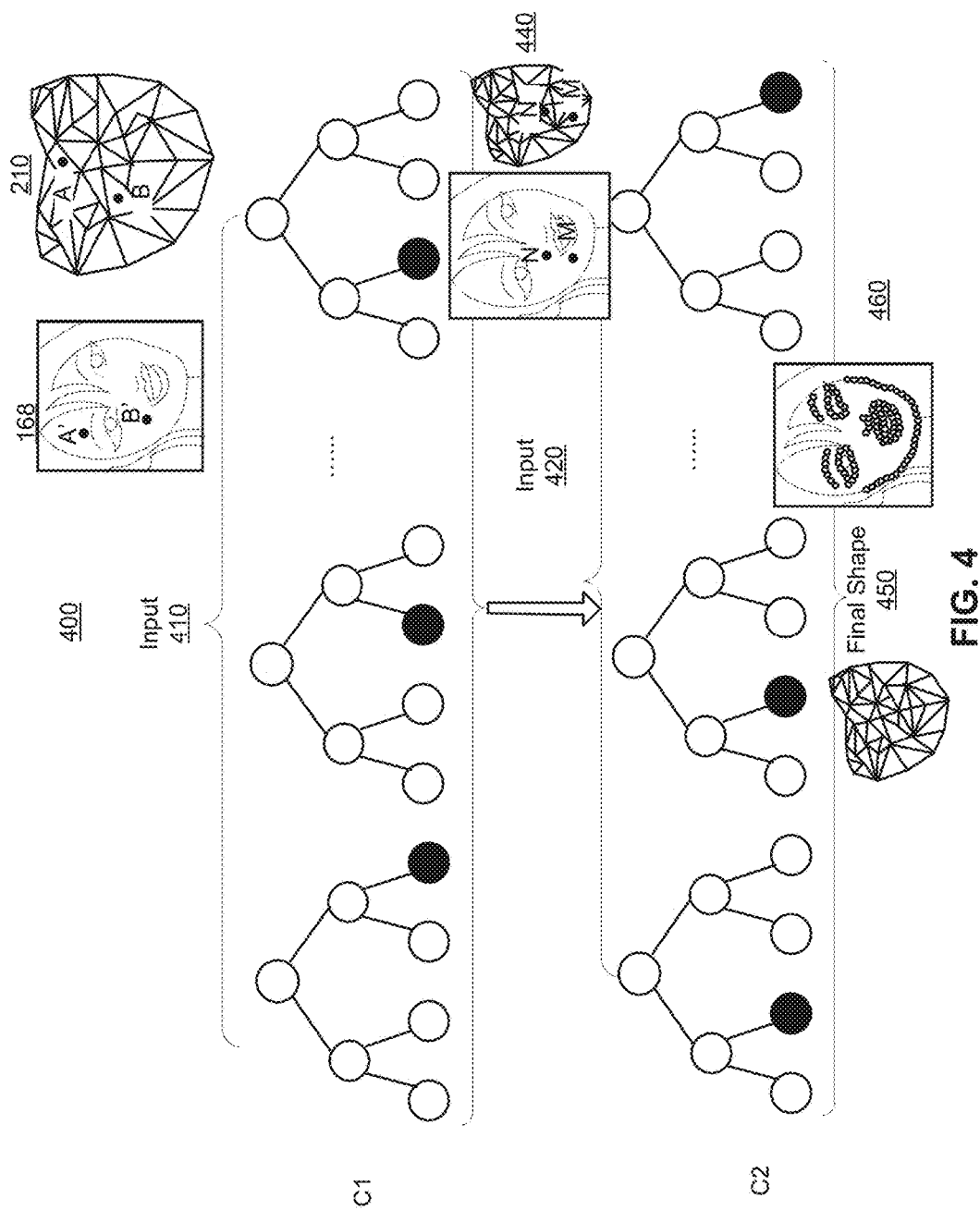
FIG. 4 shows an example of a prediction model based on a cascade of regression trees, in accordance with an embodiment.

FIG. 4 shows an example of a prediction model based on a cascade 400 of regression trees, in accordance with an embodiment. In some embodiments, a prediction model may be generated by a cascade of regression trees. A cascade of regression trees may have multiple levels and multiple regression trees for each level. A first level of the cascade predicts a fitted shape based on a captured image and a shape input to the first level. The shape input to the first level may be the adjusted default shape after adjusting the default shape to the cropped face size. Each of following levels of the cascade predicts fitted shape based on a predicted shape of a previous level and the captured face image. For each level, each tree predicts an updated adjustment vector based on the captured image and the default shape. The adjustment vectors from all the trees of a level are averaged to generate an overall adjustment vector for the level. The overall adjustment vector adjusts a current shape to generate a fitted shape. The adjustment vector specifies the modifications to the facial anchor points which may be used to generate the fitted shape.

As shown in the example of FIG. 4, the cascade 400 has 2 levels (C1, and C2) and multiple trees for each level. In this example, each tree has 2 depths. In other embodiments, a large number of trees may be included at each level, each tree may have a greater depth, and additional cascade levels may be included. For example, in one embodiment several thousand trees may be included at each level, such as 5-7000, each of the trees may have a depth of several nodes, such as five, and therefore the complete model may include eight, ten, or more cascades.

An input for level C1 has the cropped bounding box 168 and the barycentric mesh-based default shape 210. The default shape 210 may be adjusted to the cropped bounding box 168 to use the adjusted default shape 220. Each tree of level C1 traverses the decision tree as discussed in FIG. 3. For example, a node of the first tree may use two positions A and B in the default shape to determine two pixels A' and B', as described in FIG. 3. Each tree generates an adjustment vector at a leaf marked in black color. A first overall adjustment vector for level C1 may be generated by averaging adjustment vectors from all the trees in the level C1. The level C1 of the cascade 400 generates a fitted shape 440 via applying the adjustment vectors to the anchor points of the shape input to level C1, such as the adjusted default shape 220 (not shown in FIG. 4). An input for level C2 has the cropped bounding box 168 and the update shape 440. Each tree in C2 specifies positions for comparison to traverse the trees of level C2. For example, one node may specify two positions N and M corresponding to pixels N' and M'. In one embodiment, a maximum distance between positions for a node decrease from one level of the cascade to the next. For example, the distance between N' and M' in level C2 is shorter (closer together) than a distance between A' and B' in the level C1. This is further described below in Dynamic Feature Selection Section. In an example traversal of level C2, each tree in the level C2 generates an adjustment vector at a leaf marked in black color. A second overall adjustment vector may be generated by averaging adjustment vectors from all the trees in the level C2. The level C2 updates facial anchor points using the adjustment vectors to determine the facial anchor points 460 and may also generate a final shape 450.

Though the cascading trees shown in FIG. 4 include two levels for illustration, the changes to the shape from one level of the cascade to another may be applied to a large number of cascade levels and across many trees for each level with greater depth.

Figure 5:
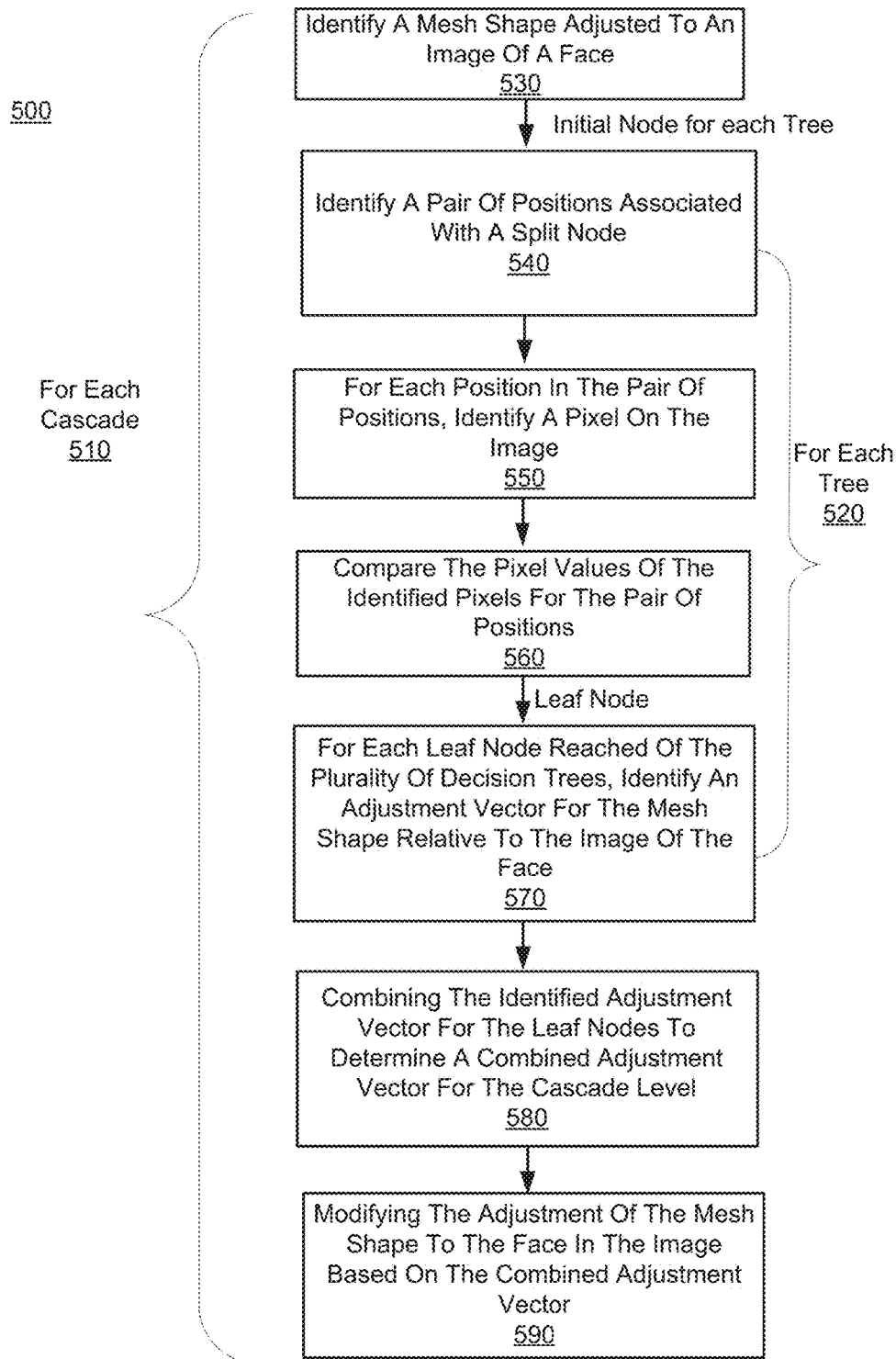
FIG. 5 is a flowchart illustrating a process for predicting a shape based on a cascade of regression trees, in accordance with an embodiment.

FIG. 5 is a flowchart illustrating a process for predicting a shape based on a cascade of regression trees, in accordance with an embodiment. The process 500 may include different or additional steps than those described in conjunction with FIG. 5 in some embodiments or perform steps in different orders than the order described in conjunction with FIG. 5.

The face tracking system 140 identifies 530 a mesh shape adjusted to an image of a face, the mesh shape having a set of elements, each element having a set of vertices. For example, the mesh shape is in a barycentric coordinate system. At a first cascade level, the mesh shape is a default shape or the default shape adjusted to the cropped image. An example is described in FIG. 4. In another example, at other cascade levels, the current shape is a fitted shape from the prior level. The fitted shape may have the same size as an image to be aligned as discussed in FIG. 4.

For each decision tree 520 in a cascade level 510 having a plurality of decision trees, each decision tree has a set of nodes including split nodes and leaf nodes, the face tracking system 140 traverses the decision tree until a leaf node is reached, the traversal beginning at an initial split node, the decision tree traversed for each split node by:

The face tracking system 140 identifies 540 a pair of positions associated with a split node, each position associated with an element in the set of elements and specifying the position in coordinates relative to the set of vertices of the element. For example, positions defined by the shape are identified by and converted to corresponding pixels on the image. The selected positions may be determined by a linear combination of vertices in corresponding mesh triangles. Examples are described above in FIGS. 3 and 4.

The face tracking system 140, for each position in the pair of positions, identifies 550 a pixel on the image based on the coordinates and the location of the set of vertices of the element on the image. The face tracking system 140 compares 560 the pixel values of the identified pixels for the pair of positions. Based on the compared pixel values and a threshold associated with the split node, the face tracking system 140 selects 570 a subsequent node in the tree. For each leaf node reached of the plurality of decision trees, the face tracking system 140 identifies 570 an adjustment vector for the mesh shape relative to the image of the face. Examples are described above in FIG. 3.

The face tracking system 140 combines 580 the identified adjustment vector for the leaf nodes to determine a combined adjustment vector for the cascade level. The face tracking system 140 modifies 590 the adjustment of the mesh shape to the face in the image based on the combined adjustment vector. Examples are described above in FIG. 4.

Training a Prediction Model Based on a Cascade of Regression Trees

To effectively use the prediction model described by FIGS. 2-5, the model is trained on face images and known anchor points of each face image. The training is used to configure the model, for example by identifying the positions to be compared by nodes, the threshold values for a node to use when traversing the tree, and to determine the positions compared by the nodes with in a tree and to determine appropriate values for the leaf nodes of each tree. To obtain an accurate prediction model, training the prediction model may include training data selection based on smart augmentation, regularization based on dynamic learning factors and cost functions, and dynamic feature selection, as further described below.

Training Data Selection Based on Smart Augmentation

Training data may be obtained from the external source 130. Training data includes a number of labeled images, each labeled image having a set of defined facial anchor points on the image. To train the decision trees to adjust shapes and output adjustments to the facial anchor points (which, for the training data, is defined), various randomized shapes are generated for each labeled image. From the randomized shapes, the decision trees are trained to generate the adjustment vectors at the various cascade levels that result in the labeled facial anchor points for the image at the conclusion of the cascade. For each labeled image, randomized shapes are generated based on defined facial anchor points. In one embodiment, to generate the randomized shapes, for each labeled image, a pair of initial shapes is generated based on the set of defined (known) facial anchor points in the labeled image. Randomized shapes are generated by interpolating between corresponding points of the pair of shapes. Additionally and/or alternatively, additional initial shapes are generated based on defined facial anchor points to generate more than a pair of initial shapes. For example, the initial shape has the same size as the labeled image and may be used to train the trees to result in the defined facial anchor points. In addition or alternatively, randomized shapes are generated by adjusting the initial shape. Examples of adjusting the initial shape include translation, rotation, scaling, reflection and shear.

The number of randomized shapes for an image to be used in the training may be based on an inverted property distribution (e.g., an inverted distribution curve) of all the labeled images. The training images may be labeled with various properties, such as whether a user has an open or a closed mouth, whether the face is rotated or tilted, and other possible properties describing the way a face is presented in the image. These properties are typically unevenly distributed throughout the training data set, such that some properties (e.g., a highly-rotated face) are comparatively uncommon. For example, a property distribution (e.g., a histogram) of all the labeled images shows more labeled images having closed mouths than labeled images having open mouths. To account for the comparatively low appearance of these properties, more randomized shapes are generated for labeled images having low-frequency property (e.g., open mouths), and fewer randomized shapes are generated for labeled images having high-frequency property (closed mouths). As such, the prediction model can be better trained for both closed mouth property and open mouth property by generating the randomized shapes for training to more evenly represent property in the data set.

Figure 6:
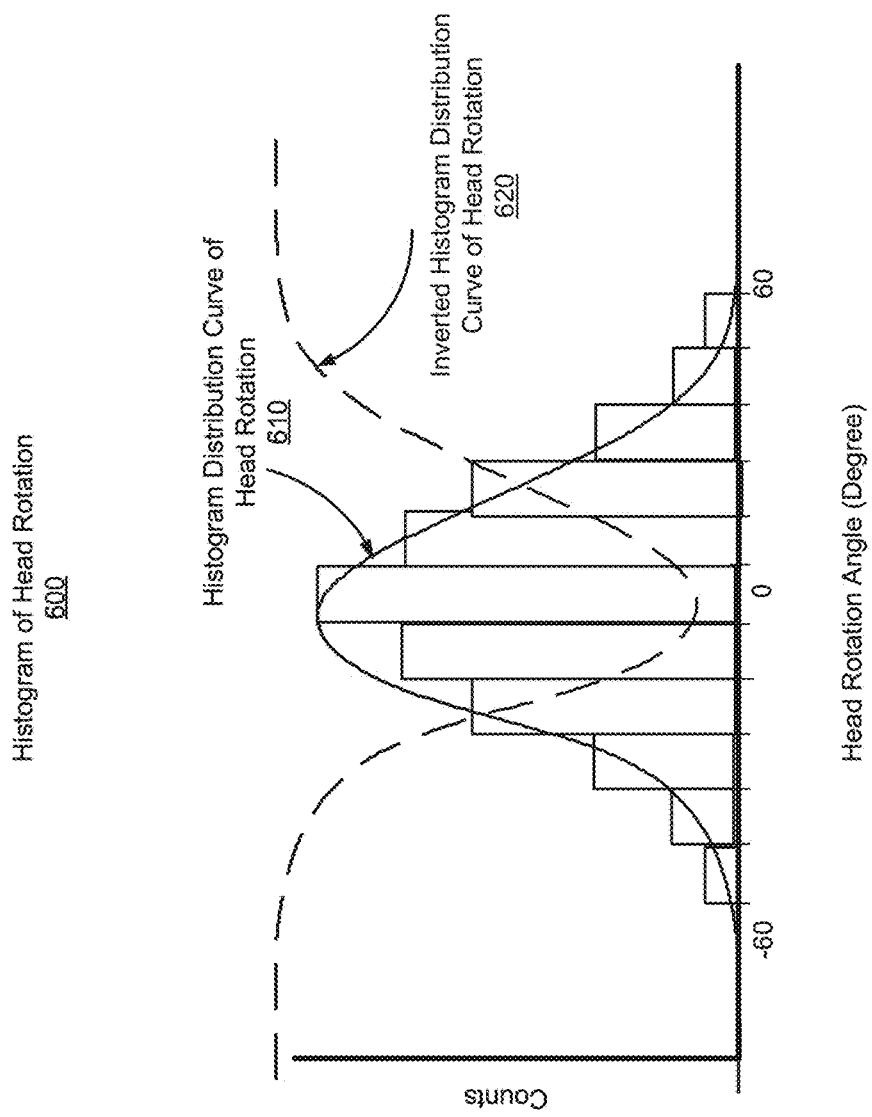
FIG. 6 shows a histogram of head rotations for selecting randomized shapes, in accordance with an embodiment.

FIG. 6 shows a histogram 600 of head rotations for selecting randomized shapes, in accordance with an embodiment. The histogram 600 shows more labeled images having head rotation angles with 0 degree than labeled images having rotated heads. The number of randomized shapes for images having a property based on an inverted histogram distribution curve 620 of the property, here head rotations. More shapes are generated for labeled images with rotated heads. The approach using inverted histogram distribution curve may be applied for other property distributions (e.g., facial pose, facial expression) to generate randomized shapes that accounts for the distribution of property.

Dynamic Learning Factors and a Cost Function

Different levels of a cascade may generate different errors for prediction. An error is defined a difference between a current shape and a target shape, which may be measured by the difference in labeled anchor points and the predicted anchor points after applying a shape modification from a set of trees. The highest level of the cascade may have largest error and the lowest level of the cascade may have smallest error.

To reduce over-fitting when training the model, variable learning factors are applied to different levels of the cascade, and when calculating leaf values on a corresponding level. The learning factor may be applied to affect the amount of correction or adjustment in a model, for example by changing an impact of a cost function on the adjustment of the model. The learning factor may be changed or increased at different levels of the cascade to increase the amount of learning at lower levels compared to higher levels. For example, a smaller learning factor is applied to top levels of the cascade (to reduce model adjustments) and comparatively larger learning factor is applied to low levels of the cascade (i.e., the levels later in the set of cascading levels). As such, the prediction model learns less at the top levels relative to large errors and learns more at the low levels having small errors. This results in more accurate prediction model by preventing top levels from over-correcting, instead permitting the lower levels to perform more sensitive adjustments.

To reduce noise in training, a Huber cost function may be used. The Huber cost function is a loss function that is that is less sensitive to outliers in data than a squared error loss function. The Huber cost function is applied when calculating leaf values on different levels of cascades. The Huber cost function is able to reduce noise and jitter in prediction by an order of magnitude. To train the models, the facial anchor points predicted by the prediction model are compared to the labeled anchor points, and the error is evaluated by the Huber cost function. The models are adjusted to reduce the error defined by the cost function.

Dynamic Feature Selection

The decision at each node in the cascade of regression trees is based on a threshold difference of intensity values at a pair of pixels. Different levels of a cascade may generate different errors for prediction. To initialize the model and training of the set of trees, the positions associated with each node (i.e., the points that are translated to sampled pixels in the image) may be randomly selected. Rather than randomly select points anywhere in the image, the selected points for a node may vary according to the cascade level or depth of a node in a tree. To provide for more coarse adjustments at higher levels of the cascade and more fine adjustments at lower levels of the cascade, the randomly selected points may be constrained to a maximum distance from one another. This distance may vary according to the cascade level, and the maximum distance is reduced in subsequent (i.e., lower) cascade levels. Thus the selected pair of pixels may be constrained to a pair of closer pixels at lower level of the cascade for fine prediction during training and testing. As shown in FIG. 4, a distance between the pixel A' and the pixel B' at the level C1 is larger than that between the pixel N' and the pixel M' at level C2.

Prediction Model Compression

Once trained, the prediction model may be large and may use a large amount of storage space, which can prevent reliable storage to a client device or convenient transmission to the client device. For example, one example embodiment may include 7000 trees, each having 32 leafs. Each of these leafs may define an adjustment vector of two-dimensional values for a set of 68 facial anchor points. Accordingly, this vector may use a significant amount of space and the facial anchor points associated with the leafs may be relatively sparse. For example, many leafs may specify zero adjustment for many facial anchor points. Therefore, the prediction model is 'compressed' for transmission to the client device, and may remain partially compressed during use by the client device, such that vector adjustment values are not added to memory (or in some cases even determined) unless required by a traversed leaf node. Since traversal of the trees does not require expansion of the adjustment values of every leaf, the values of a leaf may be expanded (e.g., determined) when the leaf is actually traversed to.

The compression may be performed by the face tracking system 140 by transforming the adjustment vectors of each leaf to correspond to a dictionary of "atoms." Each atom in the dictionary describes a function to adjust the values of one or more adjustment values. Thus, rather than defining the adjustment vector of a leaf node by the complete set of vector adjustment values, the leaf node may specify a set of atoms in the dictionary and a weight for each atom in dictionary.

The face tracking system identifies a dictionary of atoms for which to determine the atoms for a leaf. The dictionary of atoms may be defined by a matrix specifying functions and an adjustment value that is the primary adjustment value that the function is applied on. For example, a function may specify modifying the primary adjustment value and a set of nearby adjustment values according to a decaying function. By specifying a variety of functions and that can each apply different changes to the adjustment values and variously adjust other adjustment values, each atom may represent a significant amount of information about the adjustment values, and a small number of atoms together can represent significant change in the adjustment vector. Thus, in one embodiment, the dictionary defines a matrix in which one side of the matrix represents a set of functions and another side of the matrix represents the set of adjustment values. The intersection of a given adjustment value and a given function in the matrix represents an atom for applying the given function to the given adjustment value as the primary adjustment value. In one embodiment, there are 136 adjustment values in the matrix and 1024 functions.

To determine the set of atoms and the weights, the face tracking system may apply a matching pursuit algorithm, or an orthogonal matching pursuit algorithm to the adjustment vectors for the leaf nodes. These algorithms may select a set or list of atoms for each leaf node by minimizing the number of atoms to represent the leaf node while maintaining sufficient accuracy and to minimize approximation error when the selected atoms and associated weights are combined to re-create the adjustment vectors. In one method, the atoms are iteratively selected by determining the possible weights of the set of atoms represented in the adjustment vector and selecting the atom with the highest (greatest absolute value) weight and assigning that weight to the selected atom. The function of the selected atom and the assigned weight are removed or subtracted from the adjustment vector to account for its selection, and the possible weights for the atoms are recalculated to iteratively select another atom. The atoms may continue to be selected until the approximation error is below a threshold, or until a maximum number of atoms are selected, such as ten atoms.

After determining the atoms and associated weights for each leaf node, the original model (of the decision trees) can be equivalently represented by a reduced-size model that includes the atom dictionary rather than directly including the adjustment vectors for the leaf nodes. The reduced size model may also include the logic for traversing each the tree, such as the positions and designated thresholds, and the set of atoms and associated weights for each leaf node. This data may also be further compressed.

To apply the reduced-size model, the client device identifies the leaf nodes for a tree by traversing each tree according to logic for the nodes in the tree. For example by retrieving the logic specifying the tree traversal (e.g., the split node logic for a tree). The logic may specify the positions to be compared for nodes of the tree and the threshold for evaluating the resulting pixel comparison. When a leaf is reached by the tree, the set of atoms and corresponding weights associated with the leaf are identified. The dictionary is decompressed with respect to the atoms corresponding to that leaf and the function specified by each atom is applied according to the weight of the atom.

By applying the specified function of the atom at the associated weight, the adjustment vector for the leaf is determined for the reduced-size model. These adjustments for each atom are combined to generate the adjustment vector of values for the leaf node.

Since each tree may have a significant depth (e.g., with 64, 128, 256, or more leaf nodes), the reduced size model permits the client device to decompress (e.g., determine) only the adjustment values for the leaf node actually reached for a given tree. Thus, the client device decompresses and determines just a portion of the model being used at the time and may not access or determine the adjustment values for leafs that were not reached in the tree traversal.

In the example above, a prediction model that has a cascade with 10 levels. Each level has 700 trees, each tree has 5 depth ($2^5$=32 leafs), and each leaf has an adjustment vector of 68×2 values (68 points with x and y coordinates). The number of values for the model size corresponding to the adjustment values is thus 10×700×32×136. Using the learned dictionary for each leaf, 136 values may be reduced to 10 or fewer atom values, and as one example reduces a 120 Mb set of adjustment values to a 12 Mb total size, only some of which is accessed in a given traversal.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

training, by a computer using a set of sample facial images, a full-size model for adjusting a mesh shape to match facial anchor points to an image of a face, the trained full-size model having a set of decision trees, each decision tree specifying a plurality of leaf nodes accessible by logic for traversing the decision tree, each leaf node specifying a learned set of adjustment values upon which adjustments of the facial anchor points in the mesh shape are determined, the adjustment values learned in the training using the set of sample facial images, wherein the leaf nodes of the trained full-size model in total have a first number of values;

for each leaf node of one or more leaf nodes of the trained full-size model:

associating a set of one or more atoms with the leaf node, each atom describing a function to adjust one or more of the adjustment values, the associating comprising:

(i) identifying one or more atoms from a dictionary of atoms, (ii) determining that a candidate weighted combination of the atoms generates a second set of adjustment values that is within a threshold level of approximation of the learned set of adjustment values specified by the leaf node, and (iii) assigning weights to the atoms to the leaf node based on the candidate weighted combination of the atoms;

generating, from the full-size model, a reduced-size model that includes the dictionary of atoms, a reduced set of trees including the logic for traversing the set of trees to leaf nodes, and the weights of the set of one or more atoms associated with each leaf node, wherein the leaf nodes in the reduced-size model in total have a second number of values smaller than the first number; and transmitting the reduced-size model to a client mobile device having an imaging device capable of capturing facial images, wherein, in applying the reduced-size model to a captured facial image, the second set of adjustment values of a given leaf node is generated by a processor of the client mobile device by applying the weights to the set of one or more atoms associated with the given leaf node.

2. The method of claim 1, wherein applying the reduced-size model to the captured facial image comprises:

traversing a tree of the reduced set of trees in the reduced set according to the logic to identify one of the leaf nodes;

generating the second set of adjustment values by combining the set of one or more atoms for the one of the leaf nodes and the weights of the atoms; and adjusting the mesh shape based on the second set of adjustment values.

3. The method of claim 2, wherein the reduced-size model is compressed, and the reduced-size model is partially decompressed for atoms associated with the identified one of the leaf nodes.

4. The method of claim 2, wherein the atoms that are not associated with the identified one of the leaf nodes are not accessed in generating the second set of adjustment values.

5. The method of claim 1, wherein the set of one or more atoms and corresponding weights for each of the leaf nodes are determined based on a matching pursuit algorithm.

6. The method of claim 5, wherein the matching pursuit algorithm is an orthogonal matching pursuit algorithm.

7. The method of claim 1, wherein the learned set of adjustment values specified by each of the leaf nodes is represented as a sparse vector.

8. A method comprising:

receiving, by a client mobile device having an image device capable of capturing facial images, a reduced-size model that comprises (i) a dictionary of atoms each describing a function for adjusting a mesh shape, and (ii) a reduced set of trees including logic for traversing the reduced set of trees to reduced-size leaf nodes, the reduced-size model generated from a full-size model having a plurality of full-size leaf nodes each specifying a first set of adjustment values, the full-size model in total having a first number of values and the reduced-size model in total having a second number of values smaller than the first number, wherein the reduced-size model is generated by:

for each leaf node of one or more full-size leaf nodes of the full-size model:

associating a set of one or more atoms with the leaf node, the associating comprising:

(i) identifying one or more atoms from the dictionary of atoms, (ii) determining that a candidate weighted combination of the atoms generates a second set of adjustment values that is within a threshold level of approximation of the first set of adjustment values specified by the full-size leaf node, and (iii) assigning weights to the atoms to the leaf node based on the candidate weighted combination of the atoms;

capturing a facial image by the image device; and matching a current mesh shape with facial anchor points of the captured facial image, the matching comprising:

traversing one of the trees according to the logic and the facial anchor points to identify a traversed reduced-size leaf node that is associated with a set of one or more atoms;

generating the second set of adjustment values associated with the identified traversed leaf node by combining the set of one or more atoms for the identified traversed leaf node and the weights of the set of one or more atoms; and adjusting the current mesh shape based on the generated second set of adjustment values.

9. The method of claim 8, wherein the reduced-size model is compressed, and the reduced-size model is partially decompressed for atoms associated with identified traversed leaf nodes.

10. The method of claim 8, wherein the atoms that are not identified by identified traversed leaf nodes are not accessed in generating the second set of adjustment values.

11. The method of claim 8, wherein the second set of adjustment values is not stored as a part of the reduced-size model.

12. A non-transitory computer-readable medium having instructions that when executed by a processor perform the steps of:

training, by a computer using a set of sample facial images, a full-size model for adjusting a mesh shape to match facial anchor points to an image of a face, the trained full-size model having a set of decision trees, each decision tree specifying a plurality of leaf nodes accessible by logic for traversing the decision tree, each leaf node specifying a learned set of adjustment values upon which adjustments of the facial anchor points in the mesh shape are determined, the adjustment values learned in the training using the set of sample facial images, wherein the leaf nodes of the trained full-size model in total have a first number of values;

for each leaf node of one or more leaf nodes of the trained full-size model:

associating a set of one or more atoms with the leaf node, each atom describing a function to adjust one or more of the adjustment values, the associating comprising:

(i) identifying one or more atoms from a dictionary of atoms, (ii) determining that a candidate weighted combination of the atoms generates a second set of adjustment values that is within a threshold level of approximation of the learned set of adjustment values specified by the leaf node, and (iii) assigning weights to the atoms to the leaf node based on the candidate weighted combination of the atoms;

generating, from the full-size model, a reduced-size model that includes the dictionary of atoms, a reduced set of trees including the logic for traversing the set of trees to leaf nodes, and the weights of the set of one or more atoms associated with each leaf node, wherein the leaf nodes in the reduced-size model in total have a second number of values smaller than the first number; and transmitting the reduced-size model to a client mobile device having an imaging device capable of capturing facial images, wherein, in applying the reduced-size model to a captured facial image, the second set of adjustment values of a given leaf node is generated by a processor of the client mobile device by applying the weights to the set of one or more atoms associated with the given leaf node.

13. The non-transitory computer-readable medium of claim 12, wherein applying the reduced-size model to the captured facial image comprises:

traversing a tree of the reduced set of trees in the reduced set according to the logic to identify one of the leaf nodes;

generating the second set of adjustment values by combining the set of one or more atoms for the one of the leaf nodes and the weights of the atoms; and adjusting the mesh shape based on the second set of adjustment values.

14. The non-transitory computer-readable medium of claim 13, wherein the reduced-size model is compressed, and the reduced-size model is partially decompressed for atoms associated with the identified one of the leaf nodes.

15. The non-transitory computer-readable medium of claim 13, wherein the atoms that are not associated with the identified one of the leaf nodes are not accessed in generating the second set of adjustment values.

16. The non-transitory computer-readable medium of claim 12, wherein the set of one or more atoms and corresponding weights for each of the leaf nodes are determined based on a matching pursuit algorithm.

17. The non-transitory computer-readable medium of claim 16, wherein the matching pursuit algorithm is an orthogonal matching pursuit algorithm.

18. The non-transitory computer-readable medium of claim 12, wherein the learned set of adjustment values specified by each of the leaf nodes is represented as a sparse vector.

19. A non-transitory computer-readable medium having instructions that when executed by a processor perform the steps of:
    receiving, by a client mobile device having an image device capable of capturing facial images, a reduced-size model that comprises (i) a dictionary of atoms each describing a function for adjusting a mesh shape, and (ii) a reduced set of trees including logic for traversing the reduced set of trees to reduced-size leaf nodes, the reduced-size model generated from a full-size model having a plurality of full-size leaf nodes each specifying a first set of adjustment values, the full-size model in total having a first number of values and the reduced-size model in total having a second number of values smaller than the first number, wherein the reduced-size model is generated by:
        for each leaf node of one or more full-size leaf nodes of the full-size model:
            associating a set of one or more atoms with the leaf node, the associating comprising:
                (i) identifying one or more atoms from the dictionary of atoms,
                (ii) determining that a candidate weighted combination of the atoms generates a second set of adjustment values that is within a threshold level of approximation of the first set of adjustment values specified by the full-size leaf node, and
                (iii) assigning weights to the atoms to the leaf node based on the candidate weighted combination of the atoms;
    capturing a facial image by the image device; and
    matching a current mesh shape with facial anchor points of the captured facial image, the matching comprising:
        traversing one of the trees according to the logic and the facial anchor points to identify a traversed reduced-size leaf node that is associated with a set of one or more atoms;
        generating the second set of adjustment values associated with the identified traversed leaf node by combining the set of one or more atoms for the identified traversed leaf node and the weights of the set of one or more atoms; and
        adjusting the current mesh shape based on the generated second set of adjustment values.

20. The non-transitory computer-readable medium of claim 19, wherein the reduced-size model is compressed, and the reduced-size model is partially decompressed for atoms associated with identified traversed leaf nodes.

21. The non-transitory computer-readable medium of claim 19, wherein the atoms that are not identified by identified traversed leaf nodes are not accessed in generating the second set of adjustment values.

22. The non-transitory computer-readable medium of claim 19, wherein the second set of adjustment values is not stored as a part of the reduced-size model.

* * * * *